(12) United States Patent
Bartel et al.

(10) Patent No.: US 12,196,987 B2
(45) Date of Patent: Jan. 14, 2025

(54) RETROREFLECTIVE COMPOSITE REFLECTIVE MICROSPHERES AND REFLECTIVE INORGANIC MATERIAL

(71) Applicant: TUNDRA COMPOSITES, LLC, White Bear Lake, MN (US)

(72) Inventors: Adam Bartel, St. Paul, MN (US); Kurt Heikkila, Marine on the St. Croix, MN (US); John Kroll, Blaine, MN (US)

(73) Assignee: Tundra COmpoistes, LLC, White Bear Lake, MN (US)

( * ) Notice: Subject to any disclaimer, the term of this patent is extended or adjusted under 35 U.S.C. 154(b) by 384 days.

(21) Appl. No.: 17/498,533

(22) Filed: Oct. 11, 2021

(65) Prior Publication Data
US 2022/0221628 A1    Jul. 14, 2022

Related U.S. Application Data

(60) Provisional application No. 63/136,603, filed on Jan. 12, 2021.

(51) Int. Cl.
*C03C 12/00* (2006.01)
*B05D 5/06* (2006.01)
*B29D 11/00* (2006.01)
*C03C 12/02* (2006.01)
*C03C 25/46* (2006.01)
*G02B 5/128* (2006.01)

(52) U.S. Cl.
CPC .............. *G02B 5/128* (2013.01); *B05D 5/063* (2013.01); *B29D 11/00605* (2013.01); *C03C 12/02* (2013.01); *C03C 25/46* (2013.01)

(58) Field of Classification Search
CPC ......... Y10T 428/2991; Y10T 428/2996; C03C 12/02; G02B 5/128
See application file for complete search history.

(56) References Cited

U.S. PATENT DOCUMENTS

| | | |
|---|---|---|
| 2,268,537 A | 12/1941 | Leroy |
| 2,326,634 A | 8/1943 | Gebhard et al. |
| 2,379,702 A | 7/1945 | Gebhard |
| 2,610,922 A | 9/1952 | Beck |
| 2,687,968 A | 8/1954 | Beck |
| 2,790,723 A | 4/1957 | Stradley et al. |
| 2,842,446 A | 7/1958 | Beck et al. |
| 2,853,393 A | 9/1958 | Beck et al. |
| 2,883,347 A | 4/1959 | Fisher et al. |
| 2,963,378 A | 12/1960 | Palmquist et al. |

(Continued)

FOREIGN PATENT DOCUMENTS

| | | | |
|---|---|---|---|
| JP | 2006009566 A | * | 1/2006 |
| JP | 4031562 B2 | * | 1/2008 |

(Continued)

OTHER PUBLICATIONS

Translation JP 4031562 B2 (Year: 2008).*

(Continued)

*Primary Examiner* — Hoa (Holly) Le
(74) *Attorney, Agent, or Firm* — Mark DiPietro; Fred Morgan

(57) ABSTRACT

A robust sintered retroreflective composite comprising, a core bead, a peripheral bead, and an interphase coating. The bead can be used in typical retroreflective indicia and uses.

19 Claims, 2 Drawing Sheets

(56) References Cited

U.S. PATENT DOCUMENTS

| | | |
|---|---|---|
| 3,365,315 A | 1/1968 | Beck et al. |
| 4,336,092 A | 6/1982 | Wasserman |
| 4,697,407 A | 10/1987 | Wasserman |
| 4,983,458 A | 1/1991 | Dejaiffe |
| 5,057,552 A | 10/1991 | Cavitt et al. |
| 5,169,558 A | 12/1992 | Smrt et al. |
| 5,670,209 A | 9/1997 | Wyckoff |
| 5,750,191 A | 5/1998 | Hachey et al. |
| 5,853,846 A | 12/1998 | Clark et al. |
| 5,880,176 A | 3/1999 | Kamoto et al. |
| 5,900,978 A | 5/1999 | Sagar et al. |
| 5,928,761 A | 7/1999 | Hedblom et al. |
| 5,947,632 A | 9/1999 | Pirotta et al. |
| 5,948,833 A | 9/1999 | Jilek et al. |
| 5,962,108 A | 10/1999 | Nestegard et al. |
| 5,973,028 A | 10/1999 | Maxwell et al. |
| 6,011,085 A | 1/2000 | Maxwell et al. |
| 6,048,915 A | 4/2000 | Clamen et al. |
| 6,075,079 A | 6/2000 | Helmer et al. |
| 6,132,132 A | 10/2000 | Pirotta et al. |
| 6,194,486 B1 | 2/2001 | Yujiri et al. |
| 6,228,901 B1 | 5/2001 | Brown et al. |
| 6,277,437 B1 | 8/2001 | Jelmer et al. |
| 6,301,770 B1 | 10/2001 | McIlwraith |
| 6,335,083 B1 | 1/2002 | Kasai et al. |
| 6,365,262 B1 | 4/2002 | Hedblom et al. |
| 6,376,574 B1 | 4/2002 | Helmer et al. |
| 6,451,874 B1 | 9/2002 | Purgett et al. |
| 6,479,132 B2 | 11/2002 | Hedblom et al. |
| 6,479,417 B2 | 11/2002 | Frey et al. |
| 6,514,892 B1 | 2/2003 | Kasai et al. |
| 6,689,824 B2 | 2/2004 | Friel et al. |
| 6,734,226 B2 | 5/2004 | Hermes |
| 6,734,227 B2 | 5/2004 | Jing et al. |
| 6,911,486 B2 | 6/2005 | Mimura et al. |
| 7,506,523 B2 | 3/2009 | Beck |
| 7,900,474 B2 | 3/2011 | Beck |
| 8,033,671 B1 | 10/2011 | Nilsen et al. |
| 8,202,614 B2 | 6/2012 | Koene et al. |
| 8,292,539 B2 | 10/2012 | Gelfant et al. |
| 8,394,977 B2 | 3/2013 | Tiefenbruck et al. |
| 8,591,045 B2 | 11/2013 | Budd et al. |
| 9,207,373 B2 | 12/2015 | Gelfant et al. |
| 10,241,242 B2 | 3/2019 | Gelfant et al. |
| 2002/0090515 A1 | 7/2002 | Pellerite et al. |
| 2003/0036585 A1 | 2/2003 | Purgett et al. |
| 2003/0069358 A1 | 4/2003 | Helland et al. |
| 2003/0090800 A1 | 5/2003 | Humpal et al. |
| 2003/0119945 A1 | 6/2003 | Aibara |
| 2004/0157960 A1 | 8/2004 | Rowe |
| 2004/0169928 A1 | 9/2004 | Nilsen et al. |
| 2005/0015846 A1 | 1/2005 | Vistins et al. |
| 2005/0032933 A1 | 2/2005 | Hermes et al. |
| 2005/0282933 A1 | 12/2005 | Patel et al. |
| 2009/0025872 A1 | 1/2009 | Nilsen et al. |
| 2010/0221419 A1 | 9/2010 | Frey et al. |
| 2010/0272962 A1 | 10/2010 | Davies |
| 2011/0170193 A1 | 7/2011 | Budd et al. |
| 2013/0034697 A1 | 2/2013 | Shiao et al. |
| 2016/0209559 A1 | 7/2016 | McCarthy et al. |
| 2017/0242165 A1 | 8/2017 | Bachman et al. |
| 2018/0291175 A1 | 10/2018 | Wilding et al. |
| 2020/0132896 A1* | 4/2020 | Heikkila ............... C03C 12/02 |
| 2020/0241180 A1 | 7/2020 | Wilding et al. |

FOREIGN PATENT DOCUMENTS

| | | | |
|---|---|---|---|
| WO | WO-2009082644 A1 * | 7/2009 | ............ G02B 5/128 |
| WO | WO-2013065733 A1 * | 5/2013 | ............... C08K 3/34 |

OTHER PUBLICATIONS

Translation JP 2006009566 A (Year: 2006).*
3M Glass Bubbles iM16K, 2017, St. Paul, MN 55144.
3M Glass Bubbles Start something big by thinking small, 2018, St Paul MN, 55144.
Don McClure, Retroreflective Films: constructions, history, and applications, pp. 1-25, Ft. Pierce FL 34951, Yr: 2021.
Jay K. Lindly, Evaluation of Double Drop Beads Pavement Edge Lines, 2009, University Transportation Center for Alabama, UTCA Report No. 05409, Aug. 2009.
Life-Cycle Cost Analysis of Retroreflective Glass Beads, Tri-Service Pavements Working Gourp (TSPWG) Manual, Dept. of Defense, pp. 1-28, Jan. 24, 2018.
Reflective Glass Beads, Chapter 2, pp. 1-20, Yr: 2012.
Richard L. Austin, Guide to Retroreflection and Saftey Principles and Retroreflective Measurements, pp. 1-32, 2009, RoadVista, San Diego CA 92131.
Ultimate Nightime Perfromance Wet or Dry, 2013, St Paul MN, 55144.
V Fang, A review of near infrared reflectance properties of metal oxide nanostructures, GBS Science Report 2013/39, Institute Of Geological And Nuclear Sciences, Jul. 2013.

* cited by examiner

RETROREFLECTIVE COMPOSITE REFLECTIVE MICROSPHERES AND REFLECTIVE INORGANIC MATERIAL

CROSS REFERENCE TO RELATED APPLICATIONS

This application claims the benefit of U.S. Provisional Patent Application Ser. No. 63/136,603, filed Jan. 12, 2021, herein incorporated by reference in its entirety.

FIELD

The embodiments of this application relate generally to reflective or retroreflective composites that can be used in useful applications such as in reflective indicia or articles.

BACKGROUND

Retroreflective objects are known. Retroreflection is the mechanism whereby light incident on an object surface is reflected in a way that much of the incident light is directed back towards the light source. Some known retroreflective elements have centers formed of polymeric cores or binders. A pigmented core or binder may serve as a diffuse reflector, allowing spherical optical elements to be used on horizontal and vertical surfaces. Other constructions have transparent optical elements including specular reflectors such as metallic silver. The metallic surface directs light back towards the light source. Geometry and transparency of the surface and optics may make a specular coated optical element less effective when embedded in pavement marking paint on a horizontal surface, and more effective when embedded in the vertical surfaces of a retroreflective support element.

Another retroreflective element construction uses silvered glass flakes as a specular reflector on the surface of a spherical polymeric core; no spherical optical elements are used. Still another known construction has a retroreflective element with a plastic globule refracting incident light onto a layer of glass optical elements attached to the bottom of the globule. The glass optical elements focus light onto a specular coating or film located below the elements. Incident light is then reflected along the original path towards the source.

Shaped polymeric retroreflective elements with pigmented cores and glass optical elements embedded in the vertical surfaces are another alternative. These retroreflective elements are formed by extruding pigmented polymer into rods of different cross-sectional shapes. Glass optical elements are embedded into the surface of the polymer before it hardens, then the rods are sliced to form the elements.

We have found that existing retroreflective materials are difficult to manufacture and use without loss of yield. The term "yield" herein refers to the amount of the product that is damaged in some aspect in the manufacture of the retroreflective material or in the manufacture of its end use resulting in loss of retroreflectivity. Existing materials also have a fixed lifetime in the use environment requiring repeat applications. U.S. Pat. Nos. 5,670,209; 5,750,191; 5,774,265; 5,942,280; 7,513,941; 8,591,044; 8,591,045; 8,292,539 and U.S. Pat. App. Pubs. 2005/00100709; 2005/0158461; 2011/01770193; 2017/0242165; 2018/0291175 disclose bead technology.

A substantial need exists for a robust retroreflective bead that can be easily made, survive in the use environment for extended periods and provide excellent retroreflective activity in an end use product.

BRIEF DESCRIPTION

Briefly as disclosed herein, we have found a retroreflective object or retroreflective composite comprising a substrate core bead with an array of smaller peripheral beads or microspheres surrounding, fused with, or bonded to the core bead, imbedded but revealed in a single layer with a fused layer. A retroreflective composite comprising, a sintered object comprising a core bead and a peripheral bead bonded by an interphase layer.

We have found that use of an interphase as a coating composition comprising an interfacial modifier (IM), a reflective inorganic pigment and a finely divided glass particulate (having a particle size less than the peripheral bead) promotes the rapid and uniform formation of a single layer of peripheral beads substantially bonded to and surrounding the core bead. The peripheral bead and the reflective inorganic cooperate to collect and to reflect light efficiently. The fused nature of the retroreflective composite provides a durable robust retroreflective composite that can survive a harsh use environment. We have seen that virtually the entire surface of the core bead can be covered with the peripheral bead (microsphere). However, in some cases, less than an effective covering number of peripheral beads can cover the surface of the core bead leaving small gaps and in certain circumstances, minor amounts of the peripheral bead can form on the substantially complete single layer of peripheral beads. The core bead can be clear and have a refractive index but also can be substantially translucent or even opaque. The core bead can add to retroreflectivity but is not needed for basic performance.

In this context, "composite" refers to a combination of core bead, and a plurality of smaller peripheral beads with an initial coating composition (pre-sinter) or interphase layer (post-sinter) and surrounding each core bead.

The term "refractive index" means the ratio of the velocity of light in a vacuum to its velocity in a specified medium, in this case glass compositions. See ASTM E1967-19 for test.

The term "retroreflective" means that the reflection of incident light on an object is substantially directed in a vector back to the source.

The term "coating" refers to an either (i) a blend of an interfacial modifier (IM), an inorganic pigment and a finely divided glass particulate (having a particle size less than the peripheral bead) or (ii) to the addition of a layer comprising an interfacial modifier. See The term "interphase" or "interphase layer" means a layer of the coating formed on the surface of a substrate heated into a fusion layer. The interphase or interphase layer can be then used to sinter or heat bond a functional particle to the surface of the substrate. The interfacial modifier is a component that can be with others in the interphase or interphase layer.

The term "interfacial modifier" (IM) means an organo-metallic material that can be used in combination to coat the surface of any part of the core bead or peripheral bead, or glass particulate and does not react with the other components of the solid particles or with itself. An IM coated substrate is non-reactive with itself and/or other uncoated substrates. In one embodiment, the IM is an organo-metallic compound. In one embodiment, an organo-metallic interfacial modifier comprises a group IVA or IVB metal with organic substituents. In the claimed retroreflective composite, the coating containing pigment, an IM and glass participates in the formation of the initial composite that is sintered to form the final retroreflective composite.

The upon sinter, coating forms a "residue" in the retroreflective composite. If an organo-metallic IM is used, then the residue can contain at least in part the metal component of the IM. After final sinter step, the retroreflective composite is substantially free of any organic materials in the residue.

The term "core bead" is a core spherical object upon which the smaller peripheral bead spherical objects are arrayed. The "core bead" terminology can be referred to as subset of substrate.

The "peripheral bead" is a microsphere spherical object of substantially smaller diameter than the core bead that is arrayed upon the surface of the core bead.

The term "glass particulate" is a finely divided glass with a particle size substantially smaller than the peripheral bead. The peripheral bead and the glass particulate are different materials that provide different functions. The peripheral bead is a part of the retroreflective composite. The glass particulate is part of the interphase layer that bonds the peripheral bead to the core bead. The peripheral bead is not substantially changed in sintering but the glass particulate typical fuses as a part of the interphase.

The term "array" of the peripheral beads (microspheres) is ordered by the distribution of the peripheral beads on the surface of the core beads in substantially a single or monolayer. The peripheral beads and the core beads are in contact and bonded at a point via a residue derived from the unique coating composition. Once the coating is formed and fused the peripheral bead in an array is imbedded into the fused layer on the core bead, the combination is sintered to obtain a solid bond comprising atoms from the coating and peripheral bead.

A "retroreflective composite" or "composite" is a central core bead with an array of peripheral beads or microspheres on its surface bonded with an interphase layer.

The term "self-ordered" is the packing of substantially the same size peripheral bead as a monolayer, and array, on the periphery of the core bead. The density of the monolayer over the periphery is often greater than 50, 60, 70, 80 or 90% of the surface area of the periphery of the core bead.

The term "sinter" refers to a process in which a particulate or blend thereof is heated to a temperature that causes particle to particle binding to form a solid. In a sinter process the particle itself does not melt but may soften and the energy of surface atoms on the core bead periphery and particulate causes atomic migration or diffusion among particles to form bonds that cause a fusion, bonding, or solidification among adjacent particles. In the claimed sintering, the metal component of the interfacial modifier remains as a part of surface distribution, component or coating derived from the interfacial modifier reagent.

The term(s) "fusion," "fused," "bond" or "bonded" means that the central bead and the array of peripheral beads form a robust mechanically stable structure with the other optional components such as, for example, magnetic and abrasive components. The structure can be assembled and sintered with substantial yield and can be combined into a retroreflective end use object with minimal structural damage to itself and with a substantial yield of useful end products. The bond is formed by sintering wherein atoms from both the central and peripheral bead, glass particulate and other coating materials combine in a fusion layer. The bond is formed at a temperature below the melting point of the core bead, such as glass, and the peripheral bead retain their spherical nature. The bond can comprise an alloy structure or a structure formed as atoms from the coating, peripheral bead and core bead diffuses on into the other into the bond structure therebetween.

DETAILED DESCRIPTION

Figure 1:
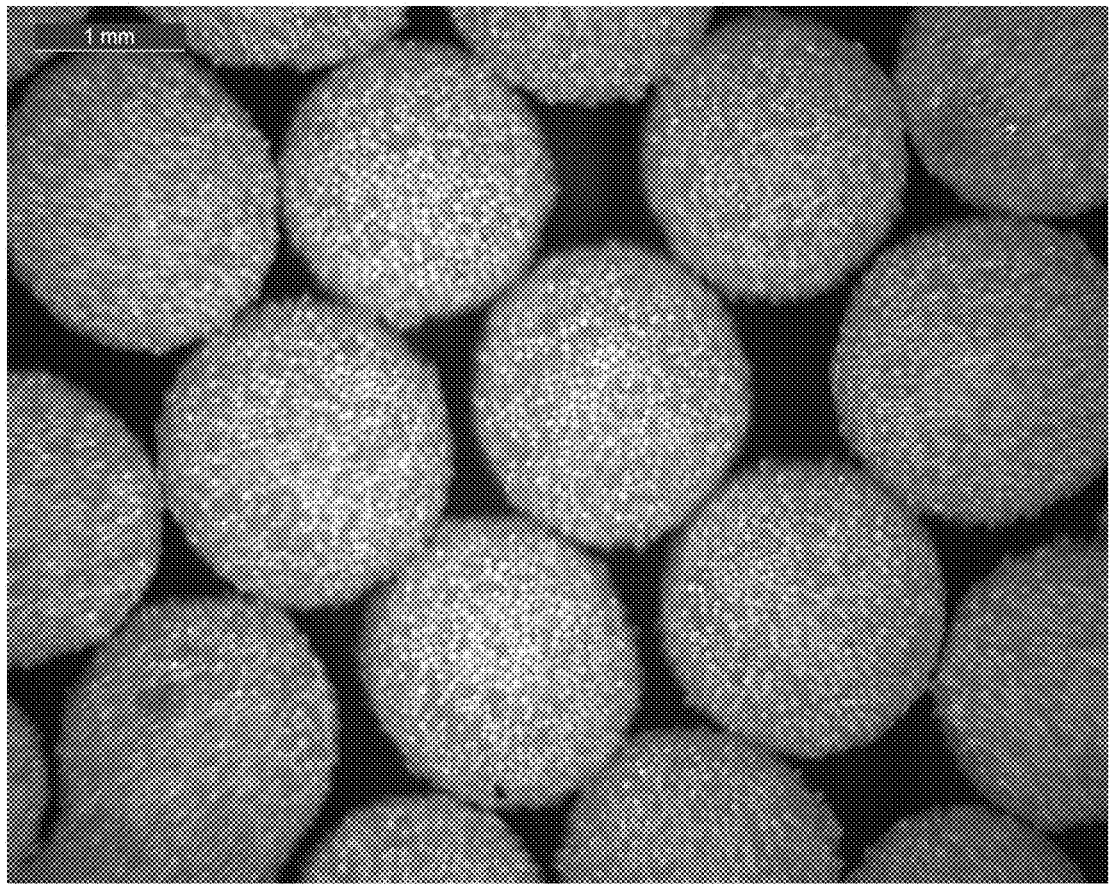
FIG. 1 photo micrograph of the retroreflective composite of Example 2.

In the claimed retroreflective composite bead, the core bead, peripheral beads, and other components are arrayed and fused or bonded to on the periphery of the core bead using the unique interphase layer coating. This arrangement presents a layer of peripheral beads for light to be transmitted, reflected, and refracted back to the source. Embodiments can be seen including but not limited to the following:

A composite retroreflective object comprising, a sintered object comprising a core bead and a peripheral bead bonded by an interphase. The core bead has a diameter of greater than 0.2 to 3 mm (500 to about 3000µ (µ)) or 1 mm to 2.5 mm or 1.2 mm to 2.0 mm, and bonded to the core bead, a plurality of peripheral beads having a diameter of less than 400µ or about 10 to about 200µ or 30 to 100µ with a refractive index that ranges from about 1 to about 3 or 1.3 to 2.7; and a coating residue wherein the object comprises the core bead and the peripheral beads and the coating residue derived from the coating composition comprising an inorganic pigment; a glass particulate having a diameter of about 1 to about 100µ and an organo-metallic interfacial modifier composition; wherein the core bead, the layer and the peripheral bead form a robust, mechanically stable bond between the peripheral bead and the core bead.

A composite retroreflective object comprising, a sintered object comprising a core bead having a diameter of about 500, to about 2000µ, and bonded to the core bead, a plurality of peripheral beads having a diameter of about 30 to about 200µ and a refractive index that ranges from about 1.5 to about 2.5; and a coating residue wherein the object comprises the core bead and the peripheral beads and the coating residue derived from the coating composition comprising a mica; a glass particulate having a diameter of about 0.5 to about 3 mm and an interfacial modifier composition; wherein the core bead, the layer and the peripheral bead form a robust, mechanically stable bond between the peripheral bead and the core bead.

Coating

In the claimed retroreflective composites, coatings are used to make a reflective and robust retroreflective composite that can be manufactured in high yields and can maintain reflectivity in a variety of use environments. A first fused coating is formed on the substrate. A second coating can be formed onto the fused layer. The combination of layers, during sintering, fuses and bonds the microspheres to the substrate.

We have beneficially found that a first coating composition of the interfacial modifier, can be combined with a second component comprising an inorganic pigment material and a third glass component comprising a finely divided glass powder or particulate (particle size smaller than the peripheral bead). The multi-component coating has the capacity to promote the interaction between the core bead and peripheral beads to form the array of peripheral beads onto the core bead before sintering. We have also found that the coating composition when sintered promotes the fusion or bonding between the peripheral beads and the core beads. Further, the inorganic pigment as stated above, depending on concentration can color the bead and act to increase the opacity of the central bead rendering them translucent or substantially opaque. Minimal pigment leaves the core nearly transparent.

The glass particulate in the coating composition at sintering temperatures promotes the glass-to-glass bonding of the peripheral beads to the fused coating layer utilizing at least some amount of the peripheral bead, glass particulate and IM to co-operate in the bonding. In this context, the term "neat" indicates that there is no continuous phase solvent or dispersed dispersion liquid such as a continuous organic solvent or aqueous phase.

The interfacial modifier, inorganic pigment and glass particulate can be blended to form a substantially uniform well dispersed material that can be contacted with the substrate such as the larger core bead to fuse one or more coating layer(s) that are in combination less than about 200μ or 20 to 120μ thickness in a final fused coating.

A second or third coating or more to obtain this dimension can be applied to the fused layer. One useful second layer is a liquid interfacial modifier that can initially bond the peripheral beads to the substrate forming a substantially single layer of array of smaller peripheral beads. This initial assembly composite is sintered into the final product. The thickness of the final interphase layer is related to the diameter of the peripheral bead. The interphase layer cannot be so thick that the bead is covered by the layer. Sufficient of the diameter of the peripheral bead should be revealed above the surface of the layer to maintain effective retroreflective properties.

Interfacial Modifier (IM) Component Used in Either Coating

This disclosure provides a retroreflective composite bead that includes a generally large spherical glass central component, and a plurality of peripheral beads connected to the central component by heat fusion/bonding of the particles under the influence of an interfacial modifier (IM)/pigment/glass coating. The peripheral beads are dispersed on the surfaces of the glass central core bead with a coating to form the retroreflective bead. The coating obtains a substantially complete self-ordered, single layer coating of the peripheral bead and enhances fusion of the peripheral beads to the glass core bead. In the heat fusion step, the heat leaves a fused bonded interphase. No significant amount of organic material is present to form a bond of the smaller component to the core bead. The fused bond includes mass from the core bead, the smaller peripheral bead or sphere and any non-organic residue from the coating including glass from the glass component of the coating.

An interfacial modifier can be used to initially form a self-ordered monolayer layer coating of the peripheral beads that covers the surface of the core bead. The initial large and small bead construct can be heated to sinter temperature to fuse the smaller peripheral bead to the core bead and to form the fused interphase layer. The resulting fused bond includes mass from the peripheral beads, the core bead, the glass particulate, and any generally inorganic component of the coating. The IM both obtains the self-ordered coating and can promote formation of the sintered fusion bonding. The appropriate interfacial modifier for manufacturing retroreflective article can be measured by monitoring the temperature of the sintering process in which the bead and the microsphere are fused to melt the coating but not the beads.

Interfacial modifiers used in the application fall into broad categories including Group IIIA, or Group VIB element compounds, for example, titanate compounds, zirconate compounds, hafnium compounds, samarium compounds, strontium compounds, neodymium compounds, yttrium compounds, phosphonate compounds, aluminate compounds and zinc compounds. Aluminates, boronates, phosphonates, titanates and zirconates that are useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen, and sulfur In one embodiment, the interfacial modifier that can be used is a type of organo-metallic material such as organo-cobalt, organo-iron, organo-boron, organo-nickel, organo-titanate, organo-aluminate organo-strontium, organo-neodymium, organo-yttrium, organo-zinc, or organo-zirconate. The specific type of organo-titanate, organo-aluminates, organo-boronate, organo-strontium, organo-neodymium, organo-yttrium, organo-zirconates which can be used, and which can be referred to as organo-metallic compounds are distinguished by the presence of at least one hydrolysable group and at least one organic moiety. Mixtures of the organo-metallic materials may be used. The mixture of the interfacial modifiers or the IM/TiO$_2$ (pigment)/glass particulate coating may be variously applied, which means at one or more than one or more than one coating may be applied, to different core beads or peripheral beads or glass particulate with various size distributions.

Certain of these types of compounds may be defined by the following general formula:

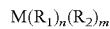

$$M(R_1)_n(R_2)_m$$

wherein M is a central atom selected from such metals as, for example, Ti, Al, and Zr and other metal centers; $R_1$ is a hydrolysable group; $R_2$ is a group consisting of an organic moiety, preferably an organic group that is non-reactive with polymer or other film former; wherein the sum of m+n must equal the coordination number of the central atom and where n is an integer ≥1 and m is an integer ≥1. Particularly $R_1$ is an alkoxy group having less than 12 carbon atoms. Other useful groups are those alkoxy groups, which have less than 6 carbons, and alkoxy groups having 1-3 C atoms. $R_2$ is an organic group including between 6-30, preferably 10-24 carbon atoms optionally including one or more hetero atoms selected from the group consisting of N, O, S and P. $R_2$ is a group consisting of an organic moiety, which is not easily hydrolyzed and is often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic. $R_2$ is substantially unreactive, i.e., not providing attachment or bonding, to other particles. Titanates provide antioxidant properties and can modify or control cure chemistry. A titanate material can be 2-propanolato, tris iso-octa-decanato-O-titanium IV, an isopropyl tri-isostearoyl titanate. Zirconate provides excellent coating and reduces formation of off color in formulated thermoplastic materials. A useful zirconate material is neopentyl (diallyl) oxy-tri (dioctyl) phosphato-zirconate.

The use of an interfacial modifier results in workable viscosity and improved structural properties in a final use such as a structural member or shaped article. Minimal amounts of the modifier can be used including about 0.005 to 10 wt.-%, about 0.01 to 8 wt.-%, about 0.05 to 6 wt.-%, or about 0.04 to 2 wt. % based on the weight final retroreflective composite.

The IM coating, with no other components, can be formed as a coating of a dimension equal to at least 3 molecular layers of IM. A substantially complete IM coating has a thickness of less than 1500 Angstroms often less than 200 Angstroms, and commonly 100 to 5000 Angstroms (Å) 50 to 1000 Angstroms (Å) or 10 to 500 Angstroms (Å).

In an embodiment, we have found that the retroreflective object is manufactured using a first coating to ensure forming an array between the peripheral bead and the core bead. The resulting product is then further coated with a second, optionally different, coating. In this way, the first ensures a quality bond between the microsphere and the bead whereas the second interfacial modifier ensures that the resulting product is fully compatible with any polymer material that may be used in an application such as a paint, tape, or film.

Glass Particulate Coating Component

The glass particulate can be a finely divided glass particle with a particle size about 20-200μ or 1 to 100μ. Such particles can be spherical, aspherical, or geometrically shaped. The glass particles typically have a particle size of less than about 25μ so they can be dispersed into the interfacial modifier composition to form a coating composition that can successfully form a coating layer on the large particle while still not interfering in the interfacial modifier. Useful glass particulate has a particle size of about 0.1 to 50μ, 2 to 40 or about 4 to 20μ and are solid, clear, soda-lime glass in a microbead form. Non-spherical glass ground and sifted to less than 25μ have also proven useful and are especially cost effective. The finely divided glass particulate used in the coating comprises a particle size substantially smaller than the peripheral bead and is a composition that can be dispersed in the final coating composition. The chemistry of the glass particulate and the core beads can be identical such that the glass particulate and the core bead are similar in glass composition that increases processability. See ASTM E2651-19 for test.

Inorganic Pigment Component

The Inorganic pigment is used to provide at least some minimal Added reflective property to the retroreflective composite and is used in the interphase with the interfacial modifier. The pigment can be used in coating the core bead with the interfacial modifier composition and obtain a nearly transparent, translucent, or nearly opaque central core bead. While organic pigments can be used, generally organic pigments primarily decompose at or below sintering temperatures. so, we have found useful inorganic pigments that are stable at sintering temperatures included many known inorganic compounds including titanium dioxide, zinc sulfide, zinc oxide, barium sulfate, iron oxide, lead chromate, bismuth vanadate, lead molybdate, cadmium compounds, chromium oxide and organic metal complexes. such complexes at sintering temperatures typically yield a metal oxide material. The inorganic pigment can also provide some reflective properties to the retroreflective composite.

In one embodiment a pigment for use in coating composition comprises mica. The interfacial modifier composition can contain about 1 to 15% mica or in other useful embodiments about 2 to 12 weight percent mica.

In one embodiment a pigment for use in coating composition comprises a titanium dioxide ($TiO_2$) material and mica. Mica is supplied with a coating of $TiO_2$ or the $TiO_2$ can be added separately.

The inorganic reflective mineral pigment is used in the retroreflective object to provide some capacity for reflecting incident light. These inorganic reflective mineral pigments are typically platelike or planar in appearance have a major diameter of 0.1 to 20μ.

These materials have no symmetrical exterior perimeter but can be very irregular, non-circular structures. These minerals are typically thin platelike planar particulate typically found in the environment but can be synthesized.

The minerals are typically nonmetallic in that they are not made from metals and have no metallic coatings. Typically, these minerals contain sodium, potassium, calcium, barium, or often rubidium or cesium species, combined with aluminum, magnesium, iron, or other species with oxide, hydroxyl, or fluorine anionic species. These minerals are typically chemically inert, somewhat flexible, lightweight, reflective, and can be transparent, translucent, or opaque, but must maintain reflective characteristics. These minerals are typically stable at elevated temperatures such as the temperatures used in centering the retroreflective objects and are often stable to 500 to 1,600° C.

One useful mineral is mica. Mica is included in a group of minerals having physical characteristics. The mica commonly mined around the world in a variety of phyllosilicates are found in igneous or metamorphic deposits but can be processed into the dimensions required by the retroreflective application. The crystal structure of mica lends itself to the capacity of being processed into small platelike or planar particulate of a dimension useful in retroreflective objects. The planar character of the mica provides a reflective aspect to the retroreflective composite. Micas are widely distributed in nature and occurs in a variety of mineral deposits where its optical properties are useful. These micas are typically composed of a substrate of mica of appropriate dimensions coated with a second material, often titanium dioxide. The resulting mica pigment produces a reflective color depending on the thickness of the coating and it can reflect a white light including all the visible spectra. These coated micas are made from mica and from about 0.1 to about 30 weight percent of the coating material. Commercial useful micas are phlogopite, or muscovite or similar groupings.

The properties of mica lend itself to applications in the optical applications as disclosed herein, wherein the processed mica can form layers in thin sheetlike or planar structures because of the nature of the microcrystalline structure.

Core Bead and Peripheral Bead Components

The claimed retroreflective composite bead has a peripheral bead and a core bead. The peripheral bead is always smaller than the core bead and has a diameter such that a plurality of peripheral beads can form a layer of beads distributed on interphase on the core bead. A combination of a core bead and a peripheral bead wherein there is about 40 to 80 to 50 to 70 wt. % of the peripheral sphere and about 20 to 40 or 20 to 30 wt. % of core bead. Percentages based on the retroreflective composite. Optionally, glass beads used within the embodiments can include both solid and hollow glass spheres. The ratio of diameters of the larger core beads to the peripheral beads is greater than 5:1, 10:1, 100:1, 200:1, or 254:1. The peripheral bead components cover the core bead component in an array (i.e.) substantially a monolayer over the surface of the central component. The surface array comprises about 50 to 100%, 60 to 98%, 70 to 97%, or 80 to 96% of coverage in a substantial monolayer.

Both the central component and the peripheral bead components are of generally spherical configuration. The core beads that form the center of the retroreflective bead article in the embodiments. These beads range in size from about 500 to 3000μ and have a high percentage population that are substantially spherical or round. Solid glass beads or spheres (including both hollow spheres and microspheres and solid particulate) are useful materials in the embodiments. These spheres are strong enough to avoid being crushed or broken during further processing, such as by high pressure spraying, kneading, extrusion, or injection molding. In some embodiments these spheres have particle sizes close to the sizes of other particulate if mixed as one material.

In some embodiments, the retroreflective bead object, either large central bead component or the small bead peripheral bead component, include at least one of silica or alumina. In some embodiments that include silica, the silica can be, for example, fumed silica, precipitated silica, surface modified silica, or nano-silica.

In some embodiments the retroreflective bead object can comprise glass beads comprising aluminosilicate, boron trioxide, borophophosilicate, borosilicate, barium titanate, cobalt, fluorophosphate, fluorosilicate, germanium dioxide, lead glass, opaline glass, soda lime, sodium hexametaphosphate, sodium silicate, tellurite, thoriated glass, uranium glass, or vitrite. The use of these glass compositions or their mixtures are to provide specific characteristic to the glass bead media such as coloring, marking, durability, cost etc.

Core Bead

The core bead can be any substantially spherical bead. In one embodiment, a glass bead can be used. Such beads can be as large as 3 mm, can be about 500μ to 3000μ and can be about 100 to 2000 The surface area of the central bead component comprises about 50 to 100% or 80 to 99% coverage in a substantial monolayer of the peripheral bead. Both the core bead and the peripheral bead can be of generally hollow solid spherical configuration. A variety of manufacturing techniques are used to make these objects. Coverage %'s is easily measured by visual inspection under minimal magnification.

Peripheral Bead

The peripheral bead can be less than 300, can be about 1 to 250μ or 10 to 200μ and can be about 20 to 150μ. The peripheral bead must maintain a substantial index of refraction that can range from about 1.5 to 3.0. In certain aspects, these peripheral beads can have a refractive index that ranges from about 1.5 to about 2.6. We can theorize that; the core bead and the peripheral bead becomes bonded in a glass-to-glass bonding at the interphase between each of the peripheral beads and the core bead due to a sintering process in which the peripheral beads and the core bead form a glass-to-glass bonding that is brought by the presence of the interfacial modifier. We have noted that surprisingly adjacent peripheral beads do not appear to bond as readily as the peripheral bead to the core. The peripheral bead components cover the central component in an array (i.e.) substantially a monolayer over the surface of the central component.

Process

In general, and broadly, the claimed retroreflective composite structure comprises a substrate or core bead with a surface covered with adhered smaller peripheral beads. Once the structure is assembled, it is sintered to ensure that the core bead and plurality of peripheral beads are mechanically attached, bonded to, or fused to the substrate core bead with the coating. The retroreflectivity of the structure primarily comes from the optical character of the peripheral beads in or on the surface. The interphase layer can be formed by the application of the coating materials in one, two, three, four or more coatings to form a uniform interphase layer with the components distributed in substantially uniform layer. In each coating step the interphase coating materials can be added serially or in any combinations.

In general, in one embodiment, the claimed structure is prepared by first forming a coating composition that contains combination of an inorganic pigment and interfacial modifier and a glass particulate in a single or multi step procedure. That combination can be added serially or in a blended and uniform mixture. If added serially the components blend as they are added and form a uniform layer. If blended the composition is added to the surface of the core bead, peripheral bead or both beads and the coating and bead are agitated until the surface of the bead(s) are covered by the combination of inorganic pigment, interfacial modifier, and small particulate glass. Once a uniform coating on substantially the entire surface of the bead(s) are obtained, the structure is then sintered at elevated temperature, such that the glass component of the coating promotes formation of a mechanically stable fused coating.

If needed, an interfacial modifier can then be added to the fused layer and a plurality of the peripheral bead can then be contacted with the coated surface of the substrate core bead and due to the action of the coating, the peripheral bead forms an ordered and substantially complete coverage of the sintered coating on the peripheral bead. If desired, the peripheral bead can be coated with interfacial modifier prior to contacting the peripheral bead with the core bead. However, if sufficient coating is added to the substrate or core bead, additional coating on the peripheral bead is optional. Once the peripheral bead forms the ordered and complete coverage on the core bead, the structure is sintered at elevated temperature to ensure that the peripheral bead is bonded, fused, or mechanically attached to the coated core bead revealing a retro reflective surface.

We have found that this method produces a claimed retroreflective article that is mechanically robust, has substantial reflectivity and can be processed without substantial degradation to the final bead or any loss to its retroreflectivity as it is either processed or incorporated into final products utilizing the retroreflective character of the claim structure.

In a first embodiment, a mixture of the core bead, the inorganic materials and IM can be made, and that retroreflective composite can be cured followed by application and sintering of the peripheral bead. After the first mixture is formed additional coating material can be layered on the retroreflective composite.

In one embodiment, a process for forming a retroreflective composite comprising coating a core bead with a dispersion of an inorganic pigment, a glass particulate, and an interfacial modifier to make an initial mixture; sintering the initial mixture to form a fused interphase layer. Coating the interphase with an interfacial modifier followed by a peripheral bead to from an initial combination; and sintering the composite bead to form a sintered composite bead; wherein the core bead, the dispersion and the peripheral bead form a robust, mechanically stable bond between the peripheral bead and the core bead. In another embodiment, after a first mixture is formed additional coating material can be layered on the composite.

IM Coating on Fused Layer

The IM coatings on the fused layer reduces the van der Waals repulsion, decreases free energy of the system and increases the surface tension also causing capillary attraction. The combination of these effects is believed to cause an ordered array due to the coating layer. In the absence of the coating the peripheral bead does not readily associate with the other components in the article. The IM coating also maintains the stability of the peripheral layer until the retroreflective composite is sintered to obtain a fused and bonded peripheral layer on the core bead.

Make Retroreflective Composite

The steps in making the retroreflective composite bead are 1) preparation of the core bead and peripheral bead components being used for making the retroreflective bead, 2) coating the large central bead component and, optionally, the smaller microsphere peripheral bead components with coating, 3) mixing the interphase components with the large bead components 4) sintering the coated central bead 5) coating the fused layer with IM and obtaining a substantially complete, single layer, self-ordered array of the small bead peripheral components onto the IM on large bead central components; and 6) sintering the core bead and peripheral bead components to form a large fused retroreflective composite bead, bonding the ordered array of a plurality of peripheral beads onto the core bead's exterior surface. The core bead component is well covered with the smaller peripheral beads on the surface of the large bead component through the effect of the coating on the surface of the large bead component. In an embodiment, the coverage of the array of small microsphere peripheral bead component over the large microsphere central bead component of the retroreflective composite is a single ordered layer, monolayer, of the smaller peripheral beads on each of the core beads. An ordered array of the small bead component on the interfacially modified surface of the large bead can be greater than 50, 60, 70, 80, 90, or 95% of the surface area of the large bead.

The process to make the retroreflective composite commences with collecting a supply of largely spherical core glass central bead or component referred to sometimes herein as "bead" or "sphere".

Suitable amounts of the coating can be added to the large central beads and the resulting combination is mixed until the large beads have a controlled exterior coating that is substantially a continuous and uniform layer over the bead surface periphery. Next the initial fused coating is sintered and then coated with IM. The smaller peripheral glass beads, optionally with an IM coating, that are generally spherical or at least rounded in form, are added to the mixture of large beads coated with the interfacial modifier and the resulting new mixture of interfacially modified coated large beads and small beads are blended.

During the blending phase, self-ordering of the small peripheral beads occurs on the surface of the core central bead. Surface tension also known as capillary attraction are believed to be forces between the central bead and the peripheral beads that causes an ordered array due to the thin interfacial modifier continuous layer. In the absence of the IM the peripheral bead does not readily associate with the central bead. An excess of IM prevents any useful association of peripheral bead to central bead. A small amount of interfacial modifier coating the large bead is transferred to the surface of the small bead during this blending process. The surface effect of the interfacial modifier on the surface of the large bead is to provide the contact point between the large and small beads. The amount or number of small beads added to the mixture can be adjusted to control the amount and extent of peripheral bead distribution on the central bead and tune the later bonding process.

After mixing and blending the large and small glass bead components, a plurality of the smaller beads is ordered as a monolayer on the surface of the core beads. The coated bead is heated to fuse the microspheres to the central bead. Once prepared the fused bead is further coated with a polymer compatible IM that enables the bead to form useful retroreflective installations with a polymer.

In this practice of the embodiment, all the processing, including mixing of the various beads and coatings, the time for the interfacial modifier to cover the surfaces of the initial group of core beads and for self-ordering of the small beads to associate the small spherical glass members to the interfacially modifier surface of the core beads to form the retroreflective composite occurs in reasonable period.

In a more specific embodiment for fabricating the retroreflective composite the retroreflective composite comprises a core bead central generally spherical glass components with each core bead having a plurality of smaller peripheral bead generally spherical glass components heat bonded to the central bead components. The heat bonded retroreflective composite provided will retroreflect any color, such as, for example, either white or yellow, according to the pigment(s) selected for incorporation into the highway marker, or other pigments that may be incorporated into countertops or safety equipment.

Sintering or Heat Bonding

When heated to a sinter temperature, the initial coating on the substrate or bead fuses to form an interphase layer that can be later used to bond the peripheral bead in a final retroreflective composite. When heated to a bonding temperature, at the peripheral bead/core bead edges, each adjacent bead and coating can combine to form a sintered/heated fused interphase bond between beads with the large bead component being the center structure and the small peripheral bead dispersed onto and heat bonded to the surfaces of the other large central components. The adjacently bonded peripheral beads fuse and bond and forms a more stable and durable surface array of peripheral beads on the large central bead. Heat bonding by alloying, atomic diffusion or atomic transport events between beads and coating residue occurs during bond formation. The driving force is the combination of atoms at the interphase and a reduction in the system free energy, manifested by decreased surface curvatures, and an elimination of surface area. The bond contains mass derived from the central bead the smaller sphere, the glass particulate, and any component of the coating. Heat bond formation is similar with adjacent microspheres.

This rigid posture of the final fused peripheral bead layer aids in retroreflection of light beams by not allowing movement of the smaller peripheral bead and thus disruption of the light refracting and reflecting through the smaller peripheral bead surfaces.

Temperatures we have used are about 500 to 1600° C. or 500 to 1250° C. Using a heating profile, of 1 minute to less than 60 minutes or 10 to 40 minutes, that ramps temperature from ambient to a maximum 500 to 900° C. and holding for a period before returning to ambient is helpful in forming the fusion bond and maintaining clarity.

The retroreflection of the retroreflective composite bead composite is an important property of the embodiment. Retro reflection results for the combination of the inorganic and the peripheral bead. When light strikes a retroreflective composite bead, it is refracted and reflected through the bead. The bead's ability to bend light is measured by its index of refraction. The retroreflectivity of glass beads is better explained by examining the path of light as it enters a single retroreflective bead embedded in a surface such as, for example, highway paint, safety apparatus, or countertops. The inorganic material also acts as a "mirror" layer to provide additional retroreflectivity to the retroreflective composite.

As the light beam enters the retroreflective bead, the beam is bent or refracted downward. This beam then shines on the back surface of the smaller bead attached to the surface of the large bead, which is partially embedded in the paint, thermoplastic, countertop, safety equipment etc. If the surface or the inorganic layer was not present, the light would continue through the bead and bounce and scatter in many directions. This is one reason for proper retroreflective bead embedment depth in the surface. The light is bent (refracted) downward by the curved surface of the small beads to a point below where the retroreflective bead is embedded in the surface. Thus, when light is reflected off the surface at the back of the bead, a large portion of that light is reflected through the retroreflective bead and then refracted back toward your eyes.

The amount of refraction of light is characteristic of the glass composition and is known as the refractive index (R.I.) of the glass. The refractive index of the glass is dependent upon the chemical nature of the glass material. Various types of glass used in the construction of the glass bead have different indices of refraction and cause different amounts of light to be retroreflected. Water has an index of refraction of 1.33 and air 1.0, while the typical single beads made with soda glass has a refractive index of 1 to 3. Contemporary beads such as used in the pavement marking industry, for example, are available in refractive indexes of 1.50, 1.65, 1.90, 2.4, and 2.5.

Retroreflectivity is dependent upon the depth of the bead in a surface, for example, pavement marking material. For said pavement marking material, optimum depth of contemporary reflective beads in pavement marking material is 50-60% to assure optimum retroreflectivity. Embedment of less than 50% may affect the longevity of the beads due to abrasion or crushing forces. Increasing embedment beyond 60% significantly decreases the amount of light that can be directed back to the driver. The retroreflective glass bead somewhat alleviates this problem because of the monolayer of many small beads heat bonded to the surface of the large beads.

For the retroreflective composite of the embodiment, the small beads arrayed on the periphery of the large bead presents many more curved surfaces for light to be transmitted, reflected, and refracted through the bead. The result is said beads can be embedded deeper into a surface such as pavement marking material without a loss of effective retroreflectivity as measured by suitable instrumentation. Further deeper embedment enhances the durability of retroreflective bead in the pavement line with resulting lower maintenance costs.

One measurement of the color of the retroreflective composite will be made with the retroreflective composite freely standing, being stacked one on another on a base. A second measurement of the color of the retroreflective composite will be made with the retroreflective composite interspersed with standard highway marking glass beads on a painted line. A third measurement of the color of the retroreflective composite will be made after retroreflective composite were interspersed with standard glass highway marking beads on a painted line after wear testing pursuant to the wear test procedure described below.

The useful formulation for the retroreflective beads is shown in the table below. The totals add up to more than 100% because of mass lost in the sintering steps. Wt. % based on final retroreflective composite.

TABLE 1

Compositional contents

| Final product | Useful amounts Wt. % | Useful amounts Wt. % |
|---|---|---|
| Core bead | 30-65 | 30-55 |
| Peripheral bead | 20-55 | 25-50 |
| Inorganic (mica and/or TiO$_2$) | 1-10 | 1-10 |
| Glass particulate | 5-40 | 10-30 |
| IM (total from both coating processes) | 0.1-15 | 0.2-8 |

DETAILED DESCRIPTION OF FIGURES

Figure 2:
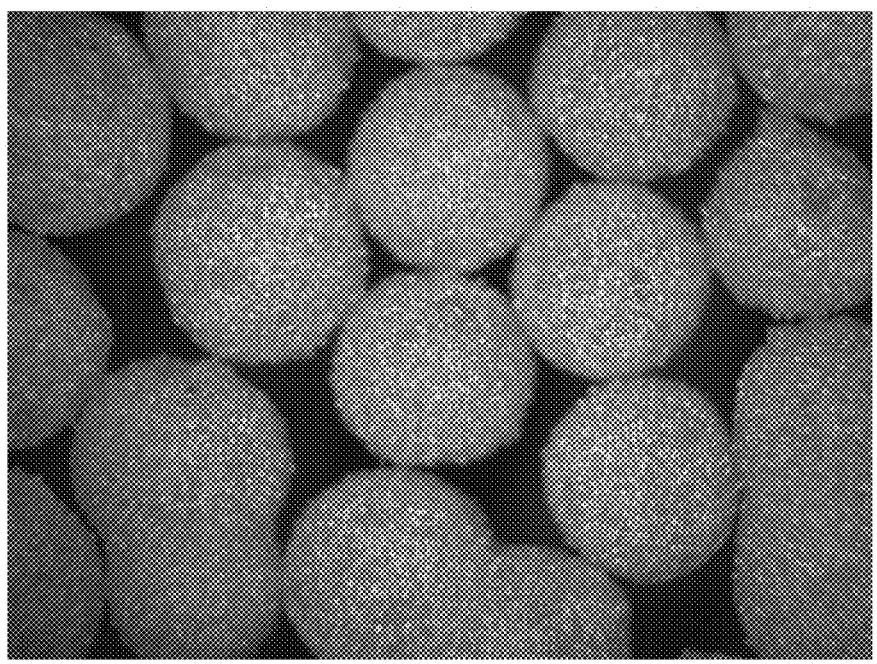
FIG. 2 photo micrograph of the retroreflective composite of Example 4.

FIG. 1 is a photo micrograph of the retroreflective composite of Example 2; and FIG. 2 is a photo micrograph of the retroreflective composite of Example 4, each figure showing a complete array of a single layer of peripheral beads on the spherical substrate.

Experimental

The following preparation is set forth to describe the production of a stable robust and reflective composite. Using this generic process, the tables 1~4 following are examples of the specific application of the process steps.

Into a 4-liter cylindrical open top heated rotary reaction vessel is placed an amount in grams of a soda lime glass bead having a diameter of 1.5 or 2.0 mm. Typically, the rotary reaction vessel is not heated and is rotated at about 1-10 rpm and into the reaction vessel is placed an amount of an interfacial modifier. The reaction vessel is rotated for approximately 5 minutes to fully coat the glass beads with the interfacial modifier forming a layer that is approximately 100 to 200µ (µ) in thickness. Apart from the reaction vessel an amount in grams of a glass particulate having a particle size of approximately 1 to 100µ is blended with an amount in grams of a mica having a rough particle size of about 5-15µ. This combination was mixed until uniform and was then placed into the reaction vessel. The reaction vessel is rotated for a period of about 1 to 15 minutes until the glass/mica blend is fully coated onto and combined with the interfacial modifier.

The interaction between the blend of glass and mica and the interfacial modifier layer causes, during rotation, the glass and mica being uniformly distributed throughout the interfacial modifier layer and further aligns the planar aspect of mica in parallel to the surface of the glass bead substrate. During the coating step the rotary reaction vessel is heated to a temperature of about ambient to 30° C., if needed to promote coating. The coated glass substrate is removed from the rotary reaction vessel and is placed in a crucible and is sintered for approximately 20 minutes with a sinter temperature profile begins at about 20° C., rapidly ramps to a temperature that ranges between about 700 and 900° C. After sintering the temperature of the crucible is reduced to ambient room temperature. This coating step is repeated building up the interphase layer to about 100-200µ, a dimension selected to form an interphase layer or bonding layer of a thickness that can reveal a significant portion of the later added peripheral bead. The fused glass interphase contains the aligned mica plates, a residue from the coating.

The sintered glass bead with the interphase layer is returned to the rotary reaction vessel and is coated with an amount in grams of interfacial modifier and the rotary reaction vessel is rotated at about six revolutions per second until the interfacial modifier forms a uniform coating on the interphase layer. To the interphase layer is introduced an amount in grams of a peripheral bead having a diameter of about 20 to 200μ and a refractive index of 1.8 to 2.4. The reaction vessel is rotated at approximately six revolution per second until the glass bead forms a substantially uniform single layer substantially completely covering the interfacially modified interphase layer. The interfacial modifier adheres the microsphere to the interphase layer and forms a mechanically stable bead layer. The contents of the reaction vessel were transferred to a crucible and sintered at approximately the same sintering profile beginning at 20° C. ramping rapidly up to 800 to 900° C. for about 20 minutes causing the micro-spherical glass bead to be fused into the interphase layer such that at least 40% of the microsphere is free of the interphase layer providing an optical retro reflective component.

The action of the interfacial modifier initially adheres the bead to the interfacial modifier but as the combination is sintered, the microsphere slowly becomes embedded into and partially surrounded by the melt interphase layer to a degree such that at a functional amount of the microsphere is revealed above the fused surface for optical purposes. The following example tables follow this process with the materials, amounts and process parameters as shown:

TABLES 2-5

Exemplary information

Example 1 2.0 mm. 1.9/2.4 RI Mica/TiO₂

| | Sinter #1 | | | Sinter #2 | | | Sinter #3 | | | Sinter #4 | | |
|---|---|---|---|---|---|---|---|---|---|---|---|---|
| Component | Mass (g) | IM Load (pph) | Component | Mass (g) | IM Load (pph) | Component | Mass (g) | IM Load (pph) | Component | Mass (g) | IM | |
| 2 mm glass | 300 | 0.666 | Sinter #1 product | 150 | 2 | Sinter #2 Product | 100 | 1 | Sinter #3 Product | 5 | 0.075 | |
| 10 ± 5μ glass | 30 | 0 | 10 ± 5μ glass | 15 | 0 | 10 ± 5μ glass | 10 | 0 | Retro bead 1.9 RI | 3 | 0 | |
| TiO₂ | 3.5 | 0 | TiO₂ | 2 | 0 | TiO₂ | 1.5 | 0 | | | | |
| Mica | 3.5 | 0 | | | | | | | | | | |
| Sinter Cycle | °C. | Time (min.) | Sinter Cycle | °C. | Time (min.) | Sinter Cycle | °C. | Time (min.) | Sinter Cycle | °C. | Time (min.) | |
| | 710 | 30 | | 750 | 30 | | 750 | 30 | | 800 | 30 | |
| | | | | | | | | | 1.9 Retroreflectivity | 5.21 cd/lx/m² | | |

Example 2 1.5 mm 2.4 RI Mica/TiO₂

| | Sinter #1 | | | Sinter #2 | | | Sinter #3 | | | Sinter | | |
|---|---|---|---|---|---|---|---|---|---|---|---|---|
| Component | Mass (g) | IM Load (pph) | Component | Mass (g) | IM Load (pph) | Component | Mass (g) | IM Load (pph) | Final Component | Mass (g) | IM (g) | |
| Glass 1.5 mm | 300 | 0.66 | Sinter #1 Product | 300 | 1 | Sinter #2 Product | 300 | 1 | 2/4 #3 Core bead | 300 | 6 | |
| 10 ± 5μ glass | 30 | 0 | 10 ± 5μ glass | 30 | 0 | 10 ± 5μ glass | 30 | 0 | 10 ± 5μ glass yellow | 3 | 0 | |
| Mica | 2 | 0 | Mica | 2 | 0 | Mica | 2 | 0 | | | | |
| TiO₂ | 5 | 0 | TiO₂ | 5 | 0 | TiO₂ | 5 | 0 | Retro Bead 2.4 RI | 150 | 0 | |
| Sinter Cycle | °C. | Time (min.) | Sinter Cycle | °C. | Time (min.) | Sinter Cycle | °C. | Time (min.) | Sinter Cycle | °C. | Time (min.) | |
| | 730 | 30, preheat | | 740 | 30, preheat | | 740 | 30, preheat | | 820 | 30, preheated | |
| | | | | | | | | | Retroreflectivity | 5.6 | cd/lx/m² | |
| | | | | | | | | | Durability | 4 out of 5 | Qual. | |

Example 3 1.5 mm 1.9 RI. Mica/TiO₂

| | Sinter #1 | | | Sinter #2 | | | Sinter #3 | | | Final Sinter | | |
|---|---|---|---|---|---|---|---|---|---|---|---|---|
| Component | Mass (g) | IM Load (pph) | Component | Mass (g) | IM Load (pph) | Component | Mass (g) | IM Load (pph) | Component | Mass (g) | IM | |
| Glass 1.5 mm | 300 | 0.66 | Sinter #1 Product | 300 | 1 | Sinter #2 Product | 300 | 1 | Sinter #3 Product | 5 | 0.15 | |
| 70μ Glass | 30 | 0 | 10 ± 5μ glass | 30 | 0 | 10 ± 5μ glass | 30 | 0 | 10 ± 5μ glass yellow | 0.05 | 0 | |
| Mica | 2 | 0 | Mica | 2 | 0 | Mica | 2 | 0 | | | | |
| TiO₂ | 5 | 0 | TiO₂ | 5 | 0 | TiO₂ | 5 | 0 | Retro Bead 1.9 RI | 2 | 0 | |

TABLES 2-5-continued

Exemplary information

| Sinter Cycle | °C. | Time (min.) | Sinter Cycle | °C. | Time (min.) | Sinter Cycle | °C. | Time (min.) | Sinter Cycle | °C. | Time (min.) |
|---|---|---|---|---|---|---|---|---|---|---|---|
| | 730 | 30, pre heated | | 740 | 30, pre heated | | 740 | 30, pre heated | | 875 | 30, pre heated |
| | | | | | | | | | Retro reflectivity | 5.2 | cd/lx/m² |
| | | | | | | | | | Durability | 4 | out of 5 |

Example 4 - 5267-136 mm 1.8 RI

| | Mixing #1 | | | Sinter #1 | | | Sinter #2 | |
|---|---|---|---|---|---|---|---|---|
| Component | Mass (g) | IM (g) | Component | Mass (g) | IM (g) | Component | Mass (g) | IM (g) |
| | | | | | | Sinter #1 | 580 | 3 |
| 10 ± 5µ glass | 210 | | 1.5 mm glass | 600 | 2 | | | |
| Mica | 24 | | Mixing # 1 | 72 | | Mica | 72 | 0 |
| Sinter Cycle | ambient | Mix Time 30 (min.) | Sinter Cycle | 780° C. | Time 20 (min.) | Sinter Cycle | 775° C. | Time 20 (min.) |

| Sinter #3 Component | Mass (g) | IM (pph) | Sinter #4 Component | Mass (g) | IM (pph) | Sinter #5 Component | Mass (g) | IM (pph) |
|---|---|---|---|---|---|---|---|---|
| Sinter #2 | 590 | | Sinter #3 | 210 | | Sinter #4 | 90 | |
| Mica | 72 | | | | | Retro Bead 1.8 RI | 58 | |
| Sinter Cycle | 775° C. | Time 20 (min.) | Sinter Cycle | 790° C. | Time 20 (min.) | Sinter Cycle | 815° C. | Time 30 (min.) |

Both retroreflective and durability were acceptable under qualitative testing.

Example 5

IM/TiO$_2$/Glass Bead Coating Composition

A mass of titanium dioxide (TiO$_2$ (pigment)) was weighed. To the TiO$_2$ (pigment) was added 5.0 pph of an interfacial modifier (IM) using a rotary blender heated (heat to 105° C.). The contents were stirred and heated until uniform and the contents were removed from the blender and pushed through a 100-mesh screen using a rubber spatula to break up any agglomerates leaving only IM coated TiO$_2$ (pigment). Glass beads (particle size D50<9µ with a mean of 11µ) were combined with 5.0 pph of interfacial modifier (IM) using a heated (heat to 105° C.) and stirred rotary reaction vessel until the glass beads were uniformly coated. The IM coated beads were removed from the rotary reaction vessel and pushed through a 100-mesh screen using a rubber spatula to break up any agglomerates leaving only coated beads.

The IM/TiO$_2$ (pigment)/glass coating composition was formed by combining a mass of the interfacially modified titanium dioxide and interfacially modified 70µ glass beads at a mass ratio of 1:TiO$_2$: spherical glass particulate in a suitable sized disposable tri-pour beaker. Mix the combined IM coated fine spherical glass powder and IM coated titanium dioxide thoroughly by hand with a stainless-steel spatula. This mixture formed the bead coating composition IM/glass composition.

We combined 9 parts by weight of the IM/Glass composition and 1 part by weight of the IM/TiO$_2$ (pigment) composition to form the coating.

Separately we coated a Core Bead 600 to 8000 with the IM at 0.5 pph. We placed a weighed mass of core bead (600 to 8000 into a beaker. We then applied the IM/TiO$_2$ (pigment)/glass bead coating composition to the IM coated core bead. We added the blended coating composition to the interfacially modified core bead in a rotating rotary reaction vessel at a mass ratio of 9.05 grams of core bead:1.00 grams of IM/TiO$_2$ (pigment)/glass coating composition. We let the contents mix for approximately 20 minutes. The agglomerations were dispersed with a spatula. After a couple minutes of mixing, and the contents were blended uniformly. We removed contents comprising the IM modified core bead coated with the IM/TiO$_2$ (pigment)/glass bead coating composition from the rotary reaction vessel and placed them in a stainless-steel pan keeping the bed-depth under about ¼ inch.

We then sintered the resulting coated core bead. We placed the stainless-steel pan of the coated core beads into a sintering oven. We sintered the pan and coated core bead contents under an open atmosphere with a 30-minute ramp up to 650° C., a 60-minute hold at 650° C., and a 30-minute ramp down to ambient. The rapid 30-minute ramp down is not possible with the lab furnace, so the sintered material is typically removed when the temperature is under ~400° C. forming the complex coated core bead.

For a second coating composition, we weighed out a mass of interfacially modified titanium dioxide and interfacially modified 10±5µ glass beads at a mass ratio of 1 titanium dioxide:9 spherical glass. A suitable sized disposable tri-pour beaker works well. We stirred/mixed the fine spherical glass powder and titanium dioxide thoroughly by hand with a stainless-steel spatula as described supra with the following procedural modifications.

We placed the previously sintered coated bead into a beaker and added a coating of IM at 1.75 pph. We stirred contents with a stainless-steel spatula for a couple of minutes to disperse the interfacial modifier to form a uniform coating on the sintered beads. We poured the contents into a rotary reaction vessel and started rotation for about 2 minutes to further increase uniformity of the interfacially modifier on the sintered bead surface. No heat was used Add the second IM/TiO$_2$ (pigment) (pigment)/glass coating composition as prepared supra to the interfacially modified sintered core bead that is in the rotating rotary reaction vessel at a mass ratio of 9.16 grams of modified bead:1.00 grams of blended IM/TiO$_2$ (pigment)/glass composition. Let the contents rotate for a couple of minutes. It is necessary to break up the agglomerations with a spatula after a couple minutes of mixing. Thereafter, the contents disperse and blend uniformly. Let rotate for about 20 minutes. The speed is quite slow to prevent dropping of the beads in the rotary mixer, a gentle rolling action is desired.

Remove contents from the rotary reaction vessel and dump into a stainless-steel pan keeping the bed-depth under about ¼ inch. Place the stainless-steel pan and contents into a sintering oven. Sinter, under open atmosphere with a 30-minute ramp up to 650° C., a 60-minute hold at 650° C., and a 30-minute ramp down to ambient as described supra.

Place the doubly coated sintered IM/TiO$_2$ (pigment)/glass coated core bead in a ceramic crucible and add interfacial modifier at 2.08 pph and mix/stir thoroughly using a stainless-steel spatula. Add the 2.4 refractive index peripheral beads, approximately 60µ. (3M), to the crucible using a mass ratio of 2.00 grams of 2.4 RI peripheral beads:1.00 gram of doubly coated core bead. Stir contents for a couple of minutes using a stainless-steel spatula. Shake contents as a last step by placing the open top of the ceramic crucible inside a tight-fitting tri-pour beaker and by holding tightly. Repeat shaking about 20-30 times and stop with the last shake forcing the contents into the crucible. Packed the contents with a blunt metal dowel using moderate hand pressure. The top of the uppermost beads remained uncovered. Sprinkled more 2.4 RI beads over the top of the contents until completely covered and repress the bed with the blunt metal object. No uncovered large beads were visible after the second packing.

Place the ceramic crucible and the resulting coated contents into a sintering oven. Sinter, under atmosphere with a 40-minute ramp up to 760° C., a 90-minute hold at 760° C., and a 40-minute ramp down to ambient. The rapid 40-minute ramp down is not possible with the lab furnace, so the sintered material is typically removed when the temperature is under ~400° C. Gently break-up the frangible contents in the crucible as slight blocking might have taken place. Roll over a 40 to 60 mesh screen to remove the excess 2.4 RI beads. Gently roll the sintered beads over the screen to debur any satellite peripheral beads to end up with a monolayer of attached peripheral beads on the doubly IM layered, sintered core bead.

Example 6

Substantially using the process as shown in Example 1, the following retroreflective composite bead was made. About 362 grams of large core bead, having a particle size of 600-800µ, was combined with IM at a ratio of about 0.5 pph. Separately 36 grams of the glass particulate, having a particle size of 5-7µ was combined with about 5 parts by weight of IM. Also, separately about 4 grams of the TiO$_2$ (pigment) was combined with about 5 pph IM. Those three materials were combined, and as described above, and sintered with a sinter period of 60 minutes at 650° C.

About 396 grams of the sintered product was combined with 1.75 pph of IM. Separately, 39 grams of 5-7-µ glass particulate was combined with 5 pph IM. And again, 4.3 grams TiO$_2$ (pigment) was combined with 5 pph IM. Those materials were combined as described above and sintered at 650° C. for 60 minutes.

Five grams of the sintered product was combined with 5 parts per hundred of interfacial modifier followed by 11 grams of the peripheral bead no such animal, they have a solid glass sphere at 2.4 RI without additional coating. Those materials were combined and sintered at 760 degrees ° C. for 90 minutes substantially as described above.

Example 7

Substantially using the process as shown in Example 1, the following retroreflective composite beads was made. About 200 grams of Glass 2 mm core bead, having a particle size of 600-800µ, was combined with IM at a ratio of about 1 pph of glass bead. Separately 25 grams of the glass particulate, having a particle size of 5-7µ was combined with about 5 parts by weight of IM. Also, separately about 3.2 grams of the TiO$_2$ (pigment) was left uncoated. Those three materials were combined, and as described above, and sintered with a sinter period of 60 minutes at 650° C.

About 200 grams of the sintered product was combined with 2.5 pph of IM. Separately, 25 grams of glass particulate was combined with 5 pph IM. And again, TiO$_2$ (pigment) was left uncoated. Those materials were combined as described above and sintered at 650° C. for 60 minutes to form an added coating layer.

Fifteen grams of the sintered product was combined with 3.3 parts per hundred of interfacial modifier followed by 15 grams of the peripheral bead having a refractive index of 2.4 without additional IM Coating. Those materials were combined and sintered at 760° C. for 90 minutes substantially as described above.

Example 8

Substantially using the process as shown in Example 1, the following retroreflective composite bead was made. About 360 grams of glass 2 mm core bead, having a particle size of 600-800µ, was combined with IM at a ratio of about 0.5 pph glass. Separately 36 grams of the glass bead particulate, having a particle size of 5-7µ was combined with about 5 parts by weight of IM. Also, separately about 4 grams of the TiO$_2$ (pigment) was coated with 5 pph IM. Those three materials were combined, and as described above, and sintered with a sinter period of 60 minutes at 650° C.

About 360 grams of the sintered product was combined with 2 pph of IM. Separately, 36 grams of Potters 5000 A glass particulate was combined with 5 pph IM. TiO$_2$ (pigment) was coated with 5 pph IM. Those materials were combined as described above and sintered at 650° C. for 60 minutes.

Five grams of the sintered product was combined with 2 parts per hundred of interfacial modifier followed by 5 grams of the peripheral bead (3M glass), having a refractive index of 2.4 without additional IM Coating. Those materials were combined and sintered at 760° C. for 90 minutes substantially as described above.

Example 9

Substantially using the process as shown in Example 1, the following retroreflective composite bead was made.

About 360 grams of glass 2 mm core bead, having a particle size of 600-800μ, was combined with IM at a ratio of about 0.5 pph. Separately 34 grams of the glass particulate, having a particle size of 5-7μ was combined with about 5 parts by weight of IM. Also, separately about 6 grams of the $TiO_2$ (pigment) was coated with 5 pph IM. Those three materials were combined, and as described above, and sintered with a sinter period of 60 minutes at 650° C.

About 360 grams of the sintered product was combined with 1 pph of IM. Separately, 34 grams of 10±5μ glass particulate was combined with 5 pph IM. Also, separately about 6 grams of the $TiO_2$ (pigment) was coated with 5 pph IM. Those materials were combined as described above and sintered at 650° C. for 60 minutes.

Eight grams of the sintered product was combined with 1 pph IM, followed by 6 grams of the peripheral bead having a refractive index of 2.4 without additional IM Coating. Those materials were combined and sintered at 760° C. for 90 minutes substantially as described above.

Test and Measurement Procedures

The retroreflective bead object performance characteristics can be measured in several ways: retro reflectivity of the bead by itself; retroreflectivity of the bead in a painted highway marking line; color of the line after addition of the retroreflective beads as compared to color without retroreflective beads; retroreflectivity of the line after wear testing with traffic; and color of the line with retroreflective beads after wear testing.

Results from measuring retroreflectivity will be given for the examples and field trials below where retroreflectivity is expressed in millicandelas per square meter per lux, which is the unit of retroreflectivity as specified in ASTM E1710. All measurements of retroreflectivity will be made using a commercially available Mirolux 30 retro reflectometer following the procedure set forth in ASTM E1710.

Color of the retroreflective composite will be measured following the procedure set forth in ASTM E1349 entitled "Test Method for Reflectance Factor and Color by Spectrophotometer Using Bi-Directional Geometry" to determine compliance with ASTM D6628, entitled "Standard Specification for Color of Pavement Marking Materials," which is the applicable standard.

Retroreflective glass bead durability can be further evaluated using a "shake test" designed to qualitatively compare batches of retroreflective glass bead object one to another and to simulate severe abrasion of retroreflective glass bead object. In the shake test, fifty (50) grams of retroreflective glass bead object will be combined in a steel one pint can with one hundred (100) grams of grinding media, namely one-half inch by one-half inch Burundum ceramic media available from Fisher Scientific. The can will be then shaken vigorously for 60 seconds. After shaking, a 20-mesh screen is used to sieve out any loose, very fine generally spherical glass members. Material that passes through the 20-mesh screen, and hence is smaller than 20 mesh, will be then weighed, and recorded as a percentage of the retroreflective glass bead media.

A laboratory qualitative wear test was established to teats for durability. In the teat finished beads were exposed to shear using a scalpel under microscope and the durability of the bead was determined by the difficulty to remove surface retroreflective beads. On a scale of 1 to 5 with 1 being the least durable.

A field test to expose a finished stripe was conducted, consisting of paint having retroreflective glass bead and standard highway marking glass beads also applied thereto, is used to simulate exposure to severe continuous high-speed rubber wheel traffic. A sample stripe is be prepared on concrete with epoxy paint. Retroreflective glass bead object and standard highway marking beads will be applied to the epoxy paint stripe. Retroreflectivity is measured, and color determined for the stripe, using the ASTM procedures and equipment described above, both before and after the test. For the test, four-inch diameter rubber wheels, each weighted down with twenty-pound weights and spinning at a speed of 176 revolutions per minute, is run on a ten-inch diameter track to which the epoxy paint stripe, the retroreflective glass bead object, and standard highway marking beads have been applied, for sixty (60) minutes, with a short interruption after each ten-minute segment so that temperature does not rise too high due to friction.

Use/Application of Coated Retroreflective Bead

In some embodiments, the retroreflective beads may be used in tapes, films, coatings, or paints. Alternatively, the retroreflective materials can be applied to a highway surface by trucks dropping exact amounts of the retroreflective composites on freshly applied highway and colored marking lines. The lines utilize two component curing/reactive chemistries such as epoxy, epoxy hybrids, polyurethanes and polyureas and are often pigmented either yellow or light. However, the embodiments are not limited by the base color of the surface. When the retroreflective beads are applied, the line is flooded with the retroreflective beads that embed into the surface of the line. The line is ready for traffic in two to ten minutes, depending on the specific line chemistry used. Alternatively, the retroreflective bead article may be mixed with small, bare retroreflective beads known in the art.

In one option, the bead has the peripheral bead array affixed to the surface of the central bead. We have found that a retroreflective composite can be made by fusing a coating or an array of peripheral beads on the surface a core bead. These are usable in standard retroreflective uses. For example, for highway marking having high retroreflectivity both when initially installed and over the bead lifetime, allowing vehicle drivers to see highway marking lines at night and in adverse conditions during nighttime. When installed the retroreflective beads essentially retroreflect the base color of the highway marking material in which the retroreflective beads are embedded.

In another option, a kit comprising a plurality of individually packaged units of the heat bonded, retroreflective bead objects to be administered during application of the highway marking strip or during application to other surfaces requiring retroreflectivity are supplied with instructions for use. The individually packaged units may comprise heat bonded retroreflective beads all of one size. In another aspect, individually packaged units may comprise heat bonded retroreflective bead in mixed sizes. In another aspect, individually packaged units may comprise heat bonded retroreflective beads mixed with beads that are not heat bonded retroreflective beads.

A further embodiment is to apply the retroreflective beads to a highway by trucks dropping exact amounts of the retroreflective beads on freshly applied thermoplastic or latex colored paint.

The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims.

The specification shows an enabling disclosure of the retroreflective composite technology, other embodiments may be made with the claimed materials. Accordingly, the invention is embodied solely in the claims hereinafter appended. The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims.

The specification shows an enabling disclosure of the retroreflective composite technology, other embodiments may be made with the claimed materials.

We claim:

1. A sintered retroreflective composite comprising
   a core bead having a diameter of greater than 500μ; and on a core bead surface,
   a plurality of peripheral beads having a diameter of less than 400μ and having a refractive index greater than about 1.8; and
   a sintered interphase coating having a thickness of about 10 to 100 μm; wherein the retroreflective composite comprises the core bead and the peripheral beads bonded with the interphase coating comprising an inorganic pigment, a glass particulate, and an interfacial modifier.

2. The composite of claim 1 wherein the inorganic pigment comprises mica.

3. The composite of claim 2 wherein the inorganic pigment comprises a combination of mica and $TiO_2$.

4. The composite of claim 3 wherein the inorganic pigment comprises mica with a surface coating of $TiO_2$.

5. The composite of claim 1 wherein the core bead comprises a spherical core bead.

6. The composite of claim 1 wherein the core bead comprises a transparent core bead.

7. The composite of claim 6 wherein the core bead comprises a soda lime glass.

8. The composite of claim 6 wherein the core bead has a diameter of about 1 to 2.5 mm.

9. The composite of claim 6 wherein the core bead has a diameter of about 1.2 to 2 mm.

10. The composite of claim 1 wherein the peripheral bead and the glass particulate are similar in in a chemistry of the composition.

11. The composite of claim 1 wherein for every part by weight of the interfacial modifier there is about 1 to 100 parts of glass particulate and 1 to 100 parts of inorganic pigment.

12. The composite of claim 1 wherein the peripheral bead has a diameter of about 10 to 100μ.

13. The composite of claim 1 wherein the peripheral bead has a refractive index of about 1.8 to 3.

14. The composite of claim 1 wherein the peripheral bead has a refractive index of about 1.8 to 2.6.

15. The composite of claim 1 wherein the peripheral bead is a hollow glass microsphere.

16. The composite of claim 1 wherein the peripheral beads form a complete single layer of peripheral beads on the surface of the core bead.

17. The composite of claim 1 wherein the glass particulate is a finely divided glass particulate having a particle size of less than 100μ.

18. The composite of claim 1 wherein the interfacial modifier comprises an organo-metallic compound.

19. The composite of claim 1 wherein the bead comprises aluminum oxide, zirconium oxide, silicon dioxide, carborundum, titanium nitride, titanium carbide, or tungsten carbide.

* * * * *